United States Patent [19]

Zeller et al.

[11] 4,186,915
[45] Feb. 5, 1980

[54] ENERGY ABSORBING CELLULAR MATRIX FOR VEHICLES

[75] Inventors: Gary P. Zeller; DeWayne A. Landwehr, both of Anderson, Ind.

[73] Assignee: General Motors Corporation, Detroit, Mich.

[21] Appl. No.: 653,348

[22] Filed: Jan. 29, 1976

[51] Int. Cl.² ............................................. B60R 9/08
[52] U.S. Cl. ................................... 267/140; 293/122
[58] Field of Search ............. 293/71 R, 71 P, 1, 62, 293/70, 85, 88, 87, DIG. 5, 121, 122; 267/139–141; 213/221; 114/219

[56] References Cited

U.S. PATENT DOCUMENTS

| | | | |
|---|---|---|---|
| 2,732,040 | 1/1956 | De Vost et al. | 293/71 R X |
| 3,181,849 | 5/1965 | Mitchell | 267/140 |
| 3,721,433 | 3/1973 | Sobel | 293/71 R X |
| 3,822,909 | 7/1974 | Livingstone et al. | 293/71 R |
| 3,901,543 | 8/1975 | Norlin | 293/71 R |
| 3,926,462 | 12/1975 | Burns et al. | 293/71 R X |
| 3,944,271 | 3/1976 | Eggert, Jr. | 293/71 R |

FOREIGN PATENT DOCUMENTS

| | | | |
|---|---|---|---|
| 2360525 | 6/1974 | Fed. Rep. of Germany | 293/71 P |
| 659675 | 10/1951 | United Kingdom | 267/140 |

*Primary Examiner*—Charles A. Marmor
*Attorney, Agent, or Firm*—Charles R. White

[57] ABSTRACT

Soft face bumper for vehicles incorporating a resilient energy absorbing cellular matrix molded from a plastic material and having walls of longitudinally extending cells stepped in thickness to provide at least two serially arranged working zones to form a staged energy absorber.

2 Claims, 3 Drawing Figures

ENERGY ABSORBING CELLULAR MATRIX FOR VEHICLES

This invention relates to energy absorbers and more particularly to a resilient energy absorbing cellular matrix for vehicles having longitudinally extending cells formed from a latticework of intersecting walls which are stepped in thickness to provide staged working zones deflectable in series to absorb impact energy.

Prior to the present invention soft face energy absorbers for vehicle application such as for front and rear bumpers have been made from resilient plastic material and injection molded to have longitudinally extending cells. The cells of these energy absorbers in the installed position are generally parallel to the longitudinal axis of the vehicle and twist and buckle on impact to absorb impact energy. The energy absorbers of this invention and the prior art have memory and, after removal of the impact load, will gradually recover toward their original configuration generally with no apparent damage. Generally the cells of the prior energy absorbers have walls with a draft angle which taper from a minimum thickness at one end of the cells to a maximum thickness at the other end to form a single working zone. In cross section, the walls of each cell have a wedge or triangle like formation which results from the draft of the mold cores to facilitate the ejection of the cellular matrix from the mold. While the tapered wall cellular construction is an effective energy absorber when deflected, it is difficult to tailor to meet specific energy absorption requirements and often calls for excessive quantities of material in the wall construction to fulfill its purposes.

In this invention the energy absorber is molded into a multicelled unit with a latticework of intersecting walls stepped in thickness to provide separate working zones, serially deflected in accordance with energy absorption requirements, to provide a more efficient and effective energy absorber. Accordingly, it is a feature, object and advantage of this invention to provide a new and improved energy absorbing cellular medium formed from a latticework of intersecting walls having primary and secondary working zones which are operative in series with one another to absorb impact energy. On predetermined high energy impact loads the energy of impact is absorbed by the corresponding sequenced deflection of the primary and secondary zones; on lower energy impacts only the primary zone will be deflected to provide for absorption of impact energy.

Another feature, object and advantage of this invention is to provide a new and improved multicelled energy absorbing media of plastic material having intersecting walls which are stepped in thickness at a point intermediate the inner and outer ends of the walls so that primary and secondary deflecting zones are formed and with the walls of the primary zone being of reduced thickness to provide savings in weight and material and tailored to deflect in response to low energy impact loads to thereby provide more efficient use of the material forming the media.

These and other features, objects and advantages of this invention will be more apparent from the following detailed description and drawing in which.

Figure 1:
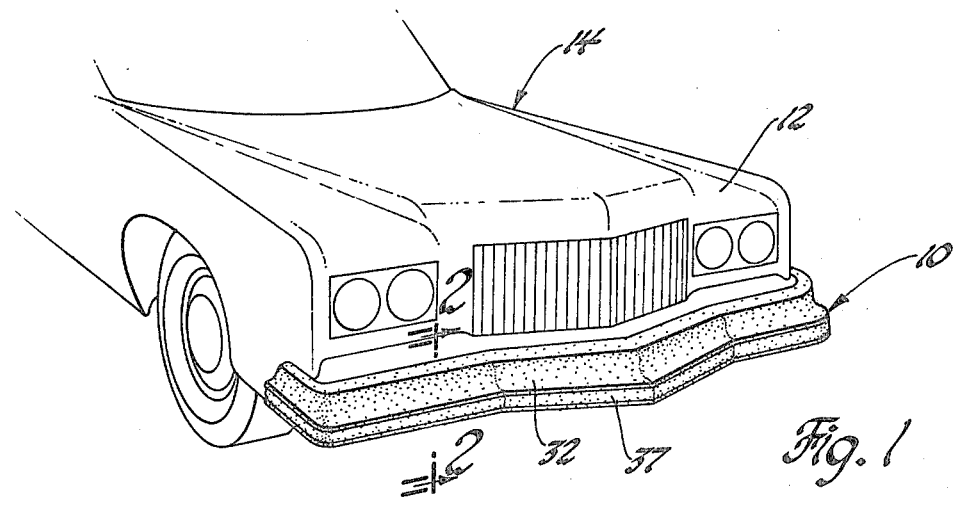
FIG. 1 is a perspective view of the front portion of a vehicle incorporating this invention.

Turning now in greater detail to the drawing, there is shown in FIG. 1 an energy absorbing bumper assembly 10 that extends horizontally across the front of the body 12 of a vehicle 14. Bumper assembly 10 comprises an elongated steel bumper beam 16 disposed externally of the vehicle body 12 which is rigidly connected to the vehicle by a pair of mounting brackets 20 of which only one is shown. Each mounting bracket is generally L-shaped in formation and has a flange 22 that fits against the rear of the bumper beam 16 and is secured thereto by bolt and nut fasteners 24. The leg 25 of each bracket extends at right angles with respect to flange 22 and fits against an associated side rail 26 of the vehicle frame and is rigidly fastened thereto by threaded fasteners 28. A flexible energy absorber 30 forming part of the bumper assembly is secured to the outer face of the bumper beam 16 by any suitable means such as threaded fasteners 31 and preferably extends across the entire width of the vehicle. This energy absorber is covered by a thin walled and flexible plastic facia 32 contoured to fit the shaped outer face of the energy absorber. The facia may be color matched with the vehicle body work or suitably coated to simulate a conventional bright work bumper. This plastic facia protects the energy absorber assembly from foreign matter such as dirt and water and provides a finished appearance for the vehicle. The facia may be secured to the bumper beam by suitable fastener means such as by threaded fasteners 34. The facia is longitudinally channeled at 35 to retain a finishing strip 37 of plastic therein as illustrated in the figures.

The vehicle energy absorber 30 comprises a resilient energy absorbing matrix formed from a suitable thermoplastic material such as a blended olefin. The matrix has a plurality of longitudinally extending and generally parallel cells 42 open throughout their lengths which are formed by a latticework of intersecting horizontal and vertically extending walls 46 and 48.

Figure 2:
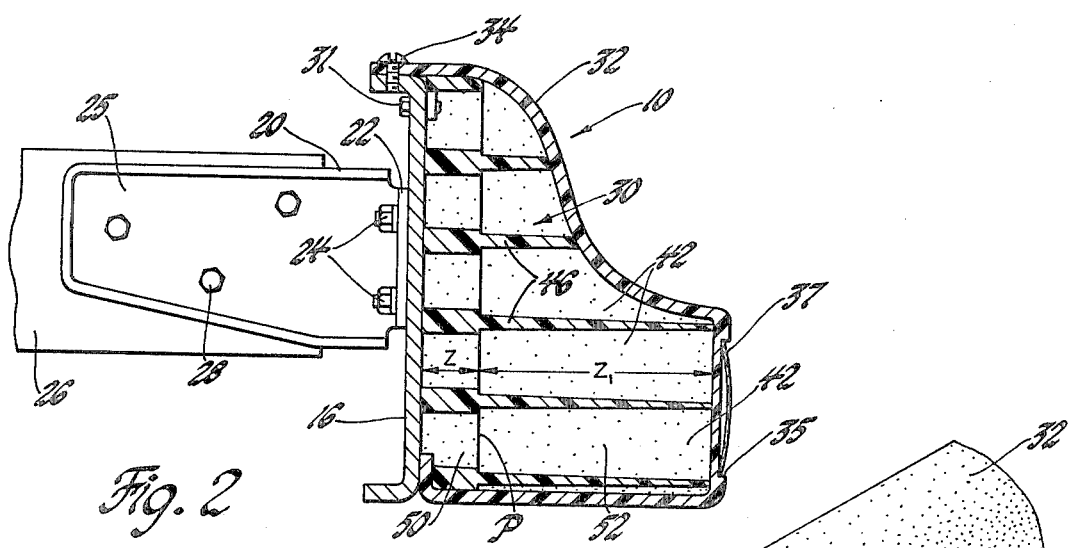
FIG. 2 is a sectional view taken along line 2—2 of FIG. 1.
Figure 3:
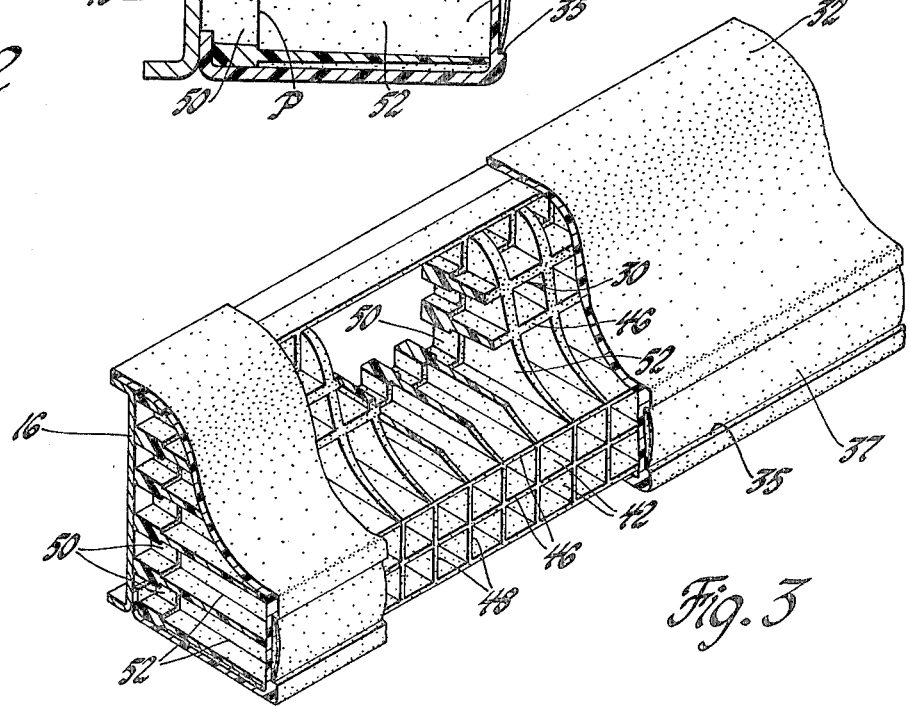
FIG. 3 is a perspective view of the energy absorber unit of this invention with parts broken away.

As shown in FIGS. 2 and 3 each of the cells 42 have a base section 50 formed by thickened portions of the horizontal and vertical walls 46 and 48 which extends from the backing beam 16 to a plane P between the front and rear ends of the matrix. The base portion of the cells provides a secondary deflection zone Z of the matrix and a yieldable backing for a forward section 52 formed by the thinned portions of the horizontal and vertical walls. As shown, this forward section provides a primary deflection zone $Z_1$. Thus the horizontal and vertical walls are stepped in thickness at plane P to provide the primary and secondary deflection zones which are staged for effective absorption of impact energy. Accordingly, in the preferred embodiment the thin walled section forming the primary deflection zone $Z_1$ will deflect in response to low speed vehicle impacts up to a predetermined load without any appreciable deflection of the substantially thicker wall section of the secondary zone Z. When this predetermined load is exceeded the secondary zone staged in series with the primary zone will deflect to provide additional energy absorption capacity.

As shown the horizontal and vertical walls of the base portion 50 and the forward section 52 are tapered as required by the cores of the injection mold used in forming the matrix. It will be appreciated that with the staged energy absorbing capability of this invention, the matrix can be tailored to provide protection to suit particular requirements. For example, the secondary zone Z can be increased in depth as needed for greater energy absorption capacity. Also with the stepped wall construction, the walls of the forward section of the matrix can be made thinner or thicker as required to meet low speed impact requirements. Thus the walls of the primary zone can be sized in thickness so more of the wall material will be distorted on predetermined impact for increased efficiency. With the thin wall section appropriately tailored to meet predetermined requirements and standards, an appreciable savings in material, weight and cost may be achieved.

While a preferred embodiment of this invention has been shown and described for purposes of illustrating this invention, other embodiments embodying the concepts of this invention may be adapted by those skilled in the art such as falls within the scope of the appended claims.

We claim:

1. A resilient multicelled matrix of plastic material for absorbing energy of an impact load applied thereto comprising a plurality of longitudinally extending cells disposed adjacent to one another, said cells being formed by a plurality of first and second wall means which intersect one another to form polygonal cell spaces therebetween, each cell extending from a back support surface to an outer impact surface so that all impact loads are transmitted to all walls of said cells simultaneously, each of said cells having a polygonal base section of predetermined thickness providing a secondary deflecting zone and comprising a first portion of said first and second wall means of a predetermined thickness extending longitudinally from one end of said matrix to predetermined points between the front and rear ends thereof, each of said cells further having an outer section polygonal in cross section and providing a primary deflecting zone and comprising a second portion of said first and second wall means integral with said first portion and extending directly outwardly from said predetermined points to the other end of said matrix, said wall means being stepped in thickness at said predetermined points forming a discrete plane so that said first portion is substantially thicker at said plane than said second portion to thereby separate said matrix into said primary and secondary working zones.

2. A resilient one piece matrix of plastic material for absorbing energy of an impact load applied thereto, said matrix having a plurality of longitudinally extending cells disposed adjacent to each other, each cell extending from a back support surface to an impact surface spaced outwardly from the back surface, said cells being formed by a plurality of first and second continuous wall means which intersect one another to form hollow polygonal cell spaces therebetween and which extend from the support surface to said impact surface, each of said wall means having a minimal thickness at one end of said matrix and a maximum thickness at the other end of said matrix, each of said wall means being stepped in thickness at predetermined points intermediate the ends thereof to form a plane dividing each of said cells into discrete first and second longitudinally extending deflection zones integrally connected in series with respect to each other, said wall means defining said first zone having at said plane a maximum thickness substantially less than the minimum thickness of said wall means defining said second zone, said first and second of said zones being both deflected in response to the application of a predetermined impact load applied thereto, and only said first zone being deflected in response to the application of an impact load thereto less than said predetermined impact load.

* * * * *